United States Patent [19]

Shen

[11] Patent Number: 4,536,451
[45] Date of Patent: Aug. 20, 1985

[54] RIGID MAGNETIC RECORDING MEDIA COATING COMPOSITION

[75] Inventor: John C. S. Shen, Rochester, Minn.

[73] Assignee: International Business Machines Corporation, Armonk, N.Y.

[21] Appl. No.: 566,070

[22] Filed: Dec. 27, 1983

[51] Int. Cl.³ .............................................. G11B 5/70
[52] U.S. Cl. .................... 428/418; 360/134; 360/135; 360/136; 427/128; 427/131; 428/524; 428/694; 428/900
[58] Field of Search .............. 428/694, 695, 418, 900, 428/524; 427/130, 131, 44, 128; 252/62.54; 360/134–136

[56] References Cited

U.S. PATENT DOCUMENTS

| | | | |
|---|---|---|---|
| 3,955,037 | 5/1976 | Marx | 427/128 |
| 4,003,743 | 1/1977 | Akashi | 427/131 |
| 4,070,522 | 1/1978 | Ogasa | 427/128 |
| 4,397,751 | 8/1983 | Dickstein | 428/694 |
| 4,405,684 | 9/1983 | Blumentritt | 428/694 |

FOREIGN PATENT DOCUMENTS

| | | | |
|---|---|---|---|
| 2451276 | 5/1976 | Fed. Rep. of Germany | 427/131 |
| 0141003 | 12/1978 | Japan | 427/130 |

Primary Examiner—Ellis P. Robinson
Attorney, Agent, or Firm—Robert W. Lahtinen

[57] ABSTRACT

A magnetic recording coating has a high density of magnetic particles uniformly dispersed in a thermoset resin binder with the dispersion applied as a thin coating onto a rigid substrate. The thermoset resin binder comprises a phenolic, an epoxy, and a styrene allylalcohol. The curing action of this coating is initiated by blocked acid catalysts. The material can be cured at a low temperature to produce a smooth, hard coating with an improved orientation ratio and without impairing the properties of the magnetic particles.

7 Claims, 3 Drawing Figures

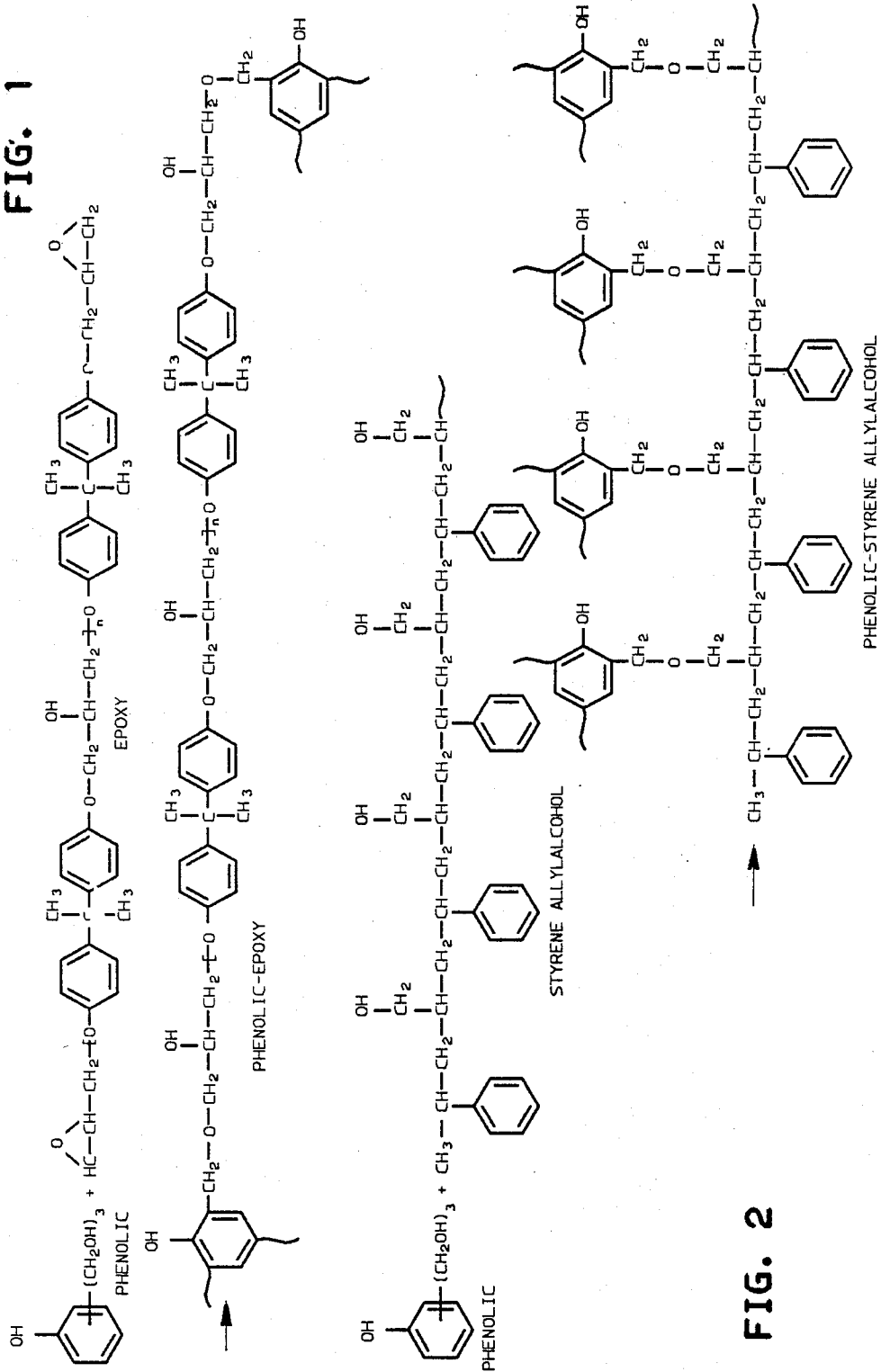

RIGID MAGNETIC RECORDING MEDIA COATING COMPOSITION

FIELD OF THE INVENTION

The present invention relates to magnetic recording materials and more particularly to an improved binder system that is capable of forming a very thin coating free of agglomeration, also provides abrasion resistance and cures at a low temperature to prevent degradation of the magnetic properties of the magnetic particles.

BACKGROUND OF THE INVENTION

As magnetic recording densities progressively increase and track widths correspondingly decrease, magnetic bit cells are of such size that the use of hard nonmagnetic particles, which have been commonly used to improve wear resistance of disk coatings, must be minimized. Further, as new magnetic particles such as cobalt surface diffused or cobalt modified gamma iron oxide magnetic particles are developed to meet density requirements, high matrix curing temperatures have been found to impair the particle magnetic properties. This degradation may occur as a consequence of cobalt diffusion and reduction of magnetic properties. Also, the coating material must be capable of forming a very thin coating with a smooth surface that will allow a transducer carrying slider assembly to fly only a few millionths of an inch above the surface. It is known in the state of the art that the thinner the coating the better the magnetic performance. A coating thickness of less than 40 microinches is commonly required by high performance rigid magnetic media. To achieve the above property, the coating material must be formed of stable of magnetic particles uniformly dispersed in a binder free from resin gel (insoluble resins). Any gel particles that exceed 1 micron must be minimized. These properties are in addition to the commonly required characteristics of magnetic disk coatings such as being adaptable to normal coating techniques, capable of withstanding repeated head loadings, able to achieve high orientation ratios and capable of good abrasion resistance, impact resistance and corrosion resistance.

The prior art includes numerous patents showing different compositions for recording coatings. U.S. Pat. No. 3,058,844 discloses a magnetic coating composition containing epoxy and phenolic resins, an acid anhydride catalyst, polyvinyl methyl ether and ferromagnetic particles. The use of an acid catalyst in this patent promotes a low cure temperature, but also causes the coating to be unstable and resin gel particles to form as a result of the unstable interation of the catalyst with epoxy at room temperature. This result is not acceptable for a thin, high performance magnetic coating. U.S. Pat. No. 3,843,404 discloses an epoxy/phenolic base magnetic coating having alumina particles dispersed therein to increase the coating durability. The use of hard nonmagnetic alumina particles to improve the durability of the coating, increases magnetic defects, and further, limits the magnetic recording density. U.S. Pat. No. 4,076,890 shows a magnetic coating composition employing resins, ferromagnetic particles and a silane coupling agent. U.S. Pat. No. 4,397,751 discloses an epoxy/phenolic base magnetic coating having a titanate coupling agent as a dispersant. Both patents describe the improvement of magnetic particle dispersion, yet require a high cure temperature to achieve good coating properties. The high temperature cure condition is not compatible with advanced cobalt modified magnetic particles.

SUMMARY OF THE INVENTION

The present invention is related to the composition of magnetic recording coatings in which magnetic particles are dispersed in a solution of three resins: epoxy, phenolic and styrene allylalcohol and which can be applied to a rigid substrate using presently utilized coating methods. The binder also includes blocked catalyst, surfactant and dispersant additives to enhance the properties of the binder, reactivity of the binder component materials or intermediate compounds and enable the binder to function with a higher concentration of magnetic particles.

The binder also improves magnetic recording material recording media abrasion resistance by using a magnetic coating which has a ternary binder composition consisting of a phenolic resin, an epoxy resin and a styrene allylalcohol resin.

It is an object of this invention to provide a new magnetic recording binder that is compatible with advanced magnetic particles. It is a further object to provide a magnetic recording material with an improved abrasion resistance by use of a hard polymer instead of hard nonmagnetic particles. It is also an object to provide a magnetic recording material in which the coating is cured at a low temperature by means of catalysis. It is another object to provide a magnetic recording material with a superior surface smoothness and a uniform coating thickness of less than 40 microinches. A still further object is to provide a magnetic recording material in which the magnetic particles are uniformly dispersed. A still further object is to provide a magnetic recording material in which the binder-binder and magnetic particle-particle are free of agglomegration. These and other objects have been realized by the magnetic recording material of the invention comprising a solution of epoxy, styrene allylalcohol and phenolic resins with organometallic catalysts or blocked acid catalysts.

BRIEF DESCRIPTION OF THE DRAWING

FIG. 1 illustrates the reaction between phenolic resin and epoxy. FIG. 2 shows the reaction between phenolic resin and styrene allylalcohol resin.

DETAILED DESCRIPTION

Figure 3:
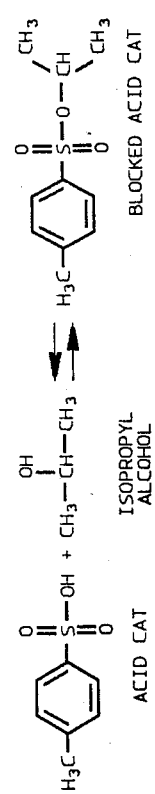
FIG. 3 shows the reaction between an acid catalyst and isopropyl alcohol to form a blocked acid catalyst.

The invention provides a magnetic recording medium consisting of a base coated with a magnetic coating material, characterized in that the binder composition in said magnetic coating material comprises from 55% to 90% thermoset phenolic-epoxy binder and from 10% to 45% of a hard/rigid thermoset phenolic-styrene allylalcohol binder. It may be pointed out that a phenolic-epoxy binder is formed by the reaction of a phenolic resin with epoxy. This type of reaction product has a tough mechanical property. Where the phenolic-styrene allylalcohol binder is formed by the reaction of a phenolic resin with a styrene allylalcohol resin to produce a product having a high degree of hardness. Combining these two types of binders produces a magnetic coating with a balance of hardness and toughness properties that is capable of withstanding repeated head loadings without coating wear. These nonalumina containing formulations must rely on the binder rather than the alumina filler particles for wear resistance. The principal components of the uncured coating are a phenolic, an epoxy and a styrene allylalcohol. The phenolic resins employed may be phenol formaldehyde, commercially known as Methylon resins (a trademark of General Electric) or substitute phenol formaldehyde such as Resinox (a trademark of Monsanto). The reaction of phenolic resin with epoxy is shown in FIG. 1, and the reaction between phenolic resin and styrene allylalcohol resin is shown in FIG. 2.

Bisphenol A type epoxy resins of molecular weights ranging from 2000 to 5000 have been selected. Then styrene allylalcohol resins used in the binder of the present invention have a molecular weight of 1000 to 2000. Also, the styrene allylalcohol resin has at least five reactive hydroxyl (—OH) sites per chain. The high functionality of styrene-allyalcohol resin produces a hard, highly abrasion resistant polymer network when cured with phenolic resin.

The weight ratio of phenolic to epoxy and styrene allylalcohol is one factor controlling the properties of coating. The physical and/or chemical effects of the ratio can be related to the type of molecular structure and molecular weight of the three binder components. In general, this coating is formulated to have phenolic-/epoxy/styrene allylalcohol ratios in the range of 3/3/4 to 3/6/1 parts by weight. The preferred ratio is 3/4/3 to obtain best results.

The coating further contains one or more additives which operate as a blocked catalyst, dispersant and/or a surfactant and nonreactive solvents. Blocked catalysts are used to promote the reaction between the phenolic and epoxy and between the phenolic and styrene allylalcohol to reduce the curing temperature and curing time. Both minimum cure temperature and shortened cure time are important to limit the possible impairment of the magnetic qualities of modern magnetic particles, such as cobalt modified iron oxide, which are magnetically superior to their predecessors, but more prone to degradation when exposed to prolonged elevated temperature.

In the case of an uncatalyzed, phenolic modified coating system, to achieve good cure reaction requires high temperature and long hours (approximately 220 degrees Celsius to 240 degrees Celsius, 2 to 3 hours); therefore, the systems require the addition of catalysts to achieve low cure cycle. It is known, in general, that acid type catalysts such as phosphoric acid, P-toluenesulfonic acid, or polymeric toluenesulfonic acid are used. It has been found that the addition of an acid catalyst often causes solution turbidity and gradual separation of insoluble particles. This is due to the interaction of acid catalysts and epoxide. The insoluble particles often have size greater than one micron. Such larger size resin gel particle is acceptable in a conventional coating system, but is not acceptable when the thickness of the coating is less than 40 microinches. Since one micron is 40 microinches, the insoluble particles become even less tolerant of irregularities and discontinuities and such defects result in missing bits that cause unusable sectors or entire tracks. To improve present media and enable the future use of thinner coatings, insoluble particles must be minimized.

One should point out that the interaction of acid catalysts and epoxide also causes a consumption of catalytic activity and further, decreases the rate of reaction.

There are two ways to minimize the above interaction. The present coating systems are obtained using blocked catalysts. The blocked catalysts are reaction products of P-toluenesulfonic acid with certain active hydrogen compounds such as isopropanol, phenol, methanol, 4-chromanone such that the addition product has only limited thermal stability. A typical example is the blocked P-toluenesulfonic acid catalyst from isopropanol shown in FIG. 3.

The blocked catalyst, as shown in FIG. 3 at the right side of the equation may dissociate at temperatures above 120 degrees C., regenerating the acid catalyst as indicated to the left of the equation. Thus, an acid catalyst can be reacted with isopropanol to give a blocked acid catalyst that is stable at room temperature.

This blocked acid catalyst could be dissolved in epoxy, phenolic, or styrene allylalcohol solution to give a mixture without causing solution turbidity or separation. Upon heating to 120 degrees C. to 150 degrees C., however, the blocked acid catalyst is "deblocked" regenerating the reactive acid catalyst which would then catalyze the phenolic-epoxy and phenolic-styrene allylalcohol reactions.

It has also been found that organometallic compounds such as stannous octoate, lead octoate, and nickel octoate promote the reactions of phenolic-epoxy and phenolic-styrene allylalcohol, without causing side interaction. The organometallic compounds such as stannous octoate are very active catalysts which reduce the conventional cure conditions significantly from 240 degrees C. to 150 degrees C. and cure time from 2 or 3 hours to 1 hour. Other catalysts used in this invention can be lead octoate, potassium octoate, dibutyltin dilaurate or other organo metallic compounds, as well as a combination of blocked acid catalysts with metallic compounds.

The dispersing agent additive serves to chelate the magnetic particles such that they are individually suspended within the uncured binder to permit the maximum orientation in the desired tangential direction along the disk surface after application of the ink or coating mixture wherein the magnetic particles are suspended. It is the effectiveness of the dispersing agent in maintaining the separation of magnetic particles, which have a natural attraction for one another, that determines the shelf life of the coating mixture. Since the chemical reaction between phenolic and epoxy and styrene allylalcohol can easily be prevented through limiting the temperature to which the coating material is exposed, the real determinant of shelf life is the ability of the coating mixture to produce a high orientation ratio in the ultimately coated disk.

Organic and inorganic compounds that contain phosphite or phosphate groups are also effective as dispersant additives. Examples are: titanate coupling agents (Kenrich Petrochemicals), commercially known as KR-112S, KR-212, KR-385, KR-55 and epoxy phosphate esters; the reaction products of epoxy resins and phosphoric acid.

The surfactant provides wetting, leveling and flow-control functions through reduced surface tension that enables smooth, defect free coatings and makes possible the high concentration of magnetic particles within the binder mixture.

To achieve an optimum magnetic coating it is necessary that the magnetic particles achieve a micro scale type dispersion within the binder. Ideally, each particle should be so dispersed as to be independently retained with the binder. This would enable maximum orientation of the particles in the desired direction. Use of the catalysts and additives identified above provides a super stable ink that can be maintained for at least 6 to 8 weeks and effective to maintain dispersion through the coating process.

Several types of volatile, nonreactive solvents can be used in the production of the present composition to reduce the solids content and enable very thin coatings to be applied to the substrate. Examples of various classes of solvents which may be added to the resins and the particulate dispersions are: aromatic solvents—toluene, xylene, ethyl benzene; ketones—methyl ethyl ketone, isophorone, methyl amyl ketone, ethyl amyl ketone, methyl isobuty ketone; and acetate-ethyl acetate, cellosolve acetate carbitol acetate, butyl acetate, butyl cellosolve acetate.

The preferred solvents employed in the composition are 60 parts by weight isophorone, 20 parts xylene and 20 parts methyl amyl ketone. It should be noted that the above exemplary list is not exclusive and that other nonreactive solvents may be employed.

The following are typical examples of the coatings of the present invention wherein the principal coating components and the additives have the weight portions indicated exclusive of associated solvents:

EXAMPLE I

| | Parts by Weight |
|---|---|
| Phenolic R-108 (General Electric) | 30.0 |
| Bisphenol-A Epoxy | 40.0 |
| Epon 1007 (Shell Chemical Company) | |
| Styrene Allylalcohol | 30.0 |
| RJ101 (Monsanto) | |
| Magnetic Particles | 120.0 |
| Organometallic Catalyst | 0.8 |
| Stannous Octoate T-9 (M & T Chem) | |
| Flurocarbon Surfactant | 0.1 |
| FC430 (3M) | |
| Dispersant Polycarboxylic Acid | 0.6 |
| BYK P104S (Mallinckrodt) | |
| Solvents | |
| Isophorone | 120.0 |
| Xylene | 40.0 |
| Methyl Amyl Ketone | 40.0 |

EXAMPLE II

| | |
|---|---|
| Phenolic Resinox P-97 (Monsanto) | 30.0 |
| Epoxy Resin DER667 (Dow Chemical) | 60.0 |
| Styrene Allylalcohol RJ100 (Monsanto) | 10.0 |
| Magnetic Particles | 180.0 |
| Cobalt Modified Iron Oxide | |
| (Pfizer EX2560) | |
| Blocked Acid Catalyst | 1.0 |
| Isopropanol Block P-toluenesulfonic Acid | |
| Dispersant Titanate Coupling Agent KR-38 S | 0.6 |
| (Kenrich) | |
| Flow Additive | 0.3 |
| PA-57 (Dow Chemical) | |
| Solvents | 420.0 |

The coatings described above are prepared using a conventional media mill process. Once the magnetic particles are well dispersed in binder, the coating then dilutes to the viscosity of 35 to 45 centipoints (CPS) with solvents and is applied to an aluminum disk substrate using conventional spin coating techniques. The magnetizable particles are then oriented circumferentially of the disk surface using the well established magnetic field orientation practice following which the coating is cured at an elevated temperature of about 150 degrees Celsius for approximately 1 hour. After cooling, the disk is polished to a 0.1 to 0.4 arithmetic average (AA) surface finish. The polished disk is then washed using deionized (DI) water and isopropanol to remove any buffing debris, and the finished disk surface is lubed using a flurocarbon type lubricant prior to magnetic test.

On a disk thus prepared, over 200,000 cycles start and stop was achieved using a magnesium ferrite head with a 3200 RPM rotational speed and fly height of 9 to 13 microinches. The reproduction output was 600 microvolt at the outer periphery and 500 microvolt at inner periphery without any sign of degradation.

What is claimed is:

1. A rigid magnetic recording medium having finely divided magnetic particles dispersed in a mixture of phenolic-styrene allylalcohol/phenolic-epoxy thermosetting resin binder composition applied as a thin film, having a thickness of less than 40 microinches, closely adhered to a rigid non-magnetic substrate wherein the coating composition includes 50 to 80 percent by weight of magnetic particles, 20 to 50 percent by weight of binder and comprises:
   10 to 45 parts by weight of a hard thermoset phenolic-styrene allkyalcohol resin,
   55 to 90 parts by weight of a tough thermoset phenolic-epoxy resin,
   and additives, including a blocked acid catalyst, not exceeding 10 parts by weight.

2. The magnetic recording composition of claim 1 wherein said additives further include a dispersant and a surfactant.

3. The magnetic recording composition of claim 2 where said blocked acid catalyst is a reaction product of P-toluenesulfonic acid with an active hydrogen compound.

4. The magnetic recording composition of claim 3 where said active hydrogen compound is selected from the group including isopropanol, methanol, phenol, cyclohexanol, and 4-chromanone.

5. The magnetic recording composition of claim 1 wherein said phenolic-styrene allylalcohol is a cured mixture of phenol formeldehyde and styrene allylalcohol, and comprises:
   10 to 40 percent by weight of phenol formaldehyde having molecular weight of 150 to 400,
   60 to 90 percent by weight of styrene allylalcohol having molecular weight of 1150 to 2300.

6. The magnetic recording composition of claim 1 wherein said phenolic-epoxy is a cured mixture of phenol formaldehyde and bisphenol A epoxy, and comprises:
   10 to 40 by weight of phenol formaldehyde having a molecular weight of 150 to 400,
   60 to 90 percent by weight of bisphenol A epoxy having a molecular weight of 1500 to 4000.

7. The magnetic recording composition of claim 1 wherein said magnetic particles include magnetic iron oxide, magnetic chromium dioxide, magnetic cobalt modified oxides, alloy particles and magnetic metal particles.

* * * * *